June 18, 1929.  S. LIPPERT  1,717,699
WINDSHIELD CLEANING APPARATUS AND MOTOR THEREFOR
Original Filed March 27, 1924  5 Sheets-Sheet 1
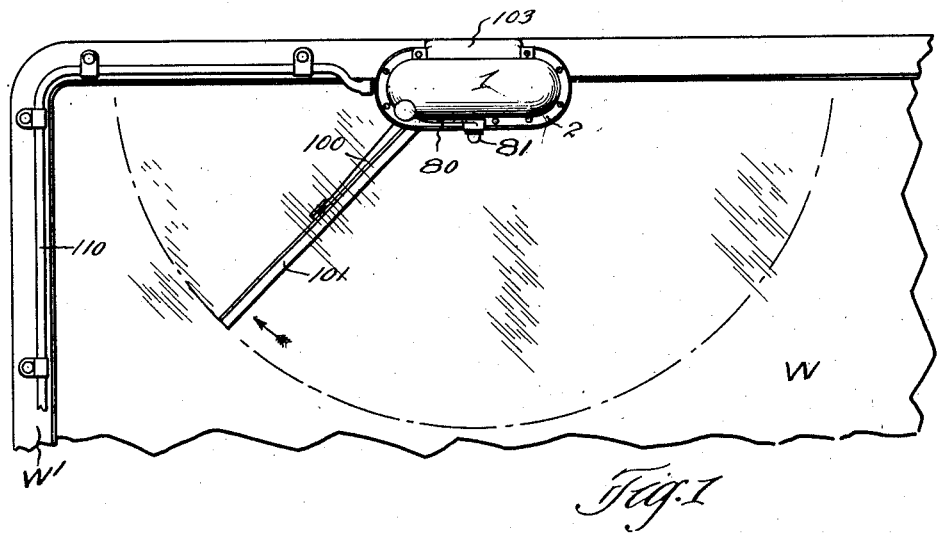
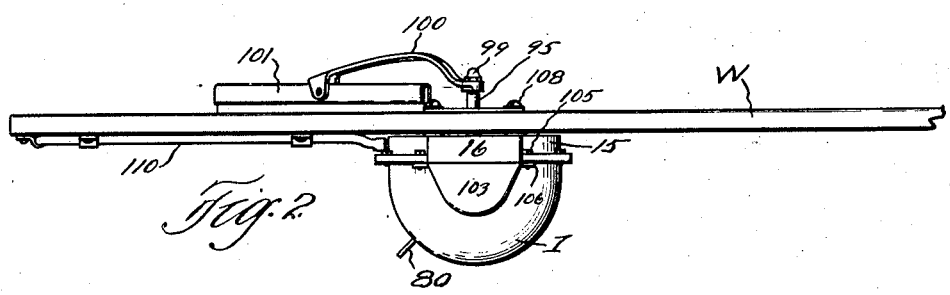
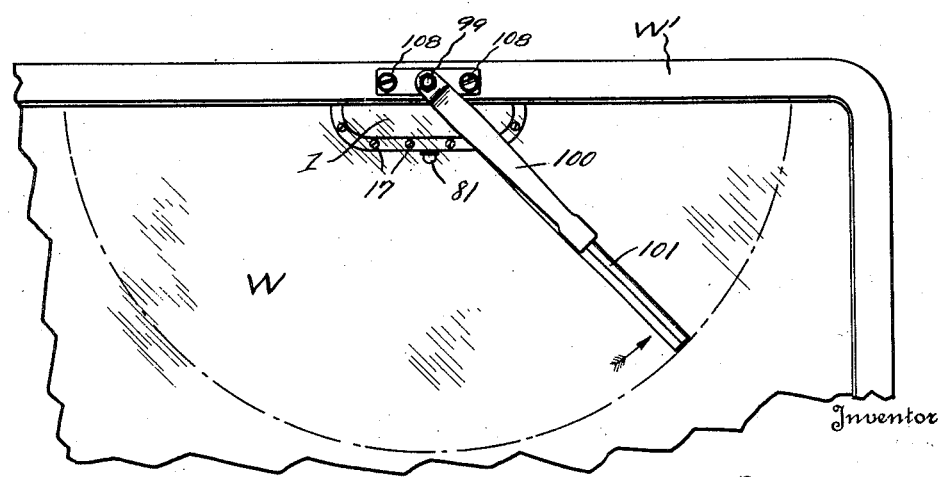

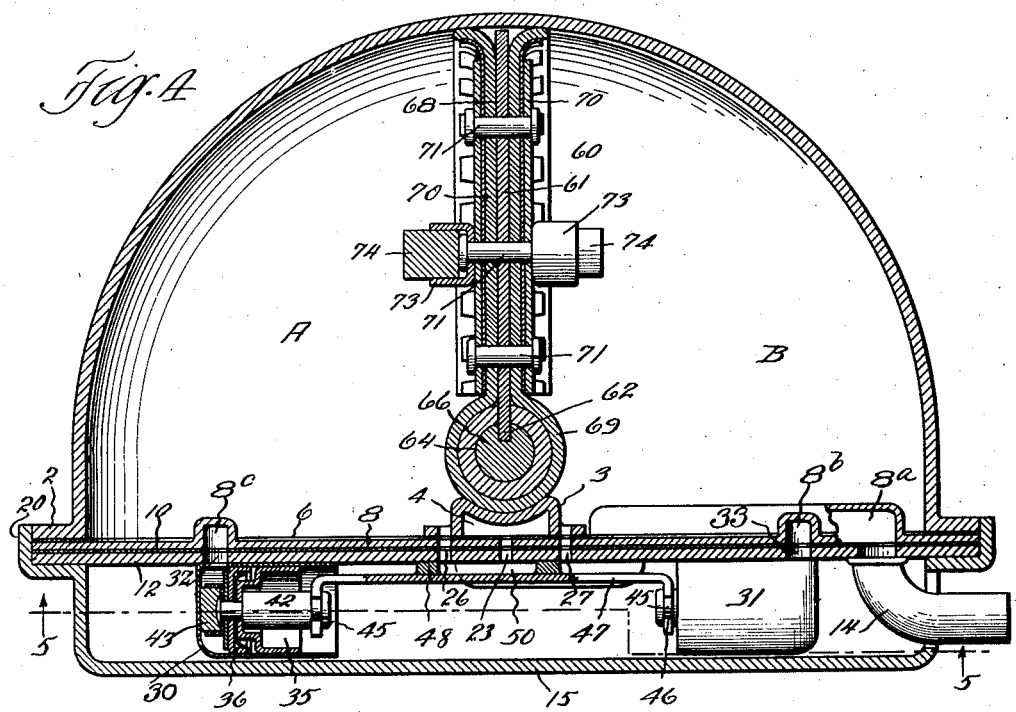

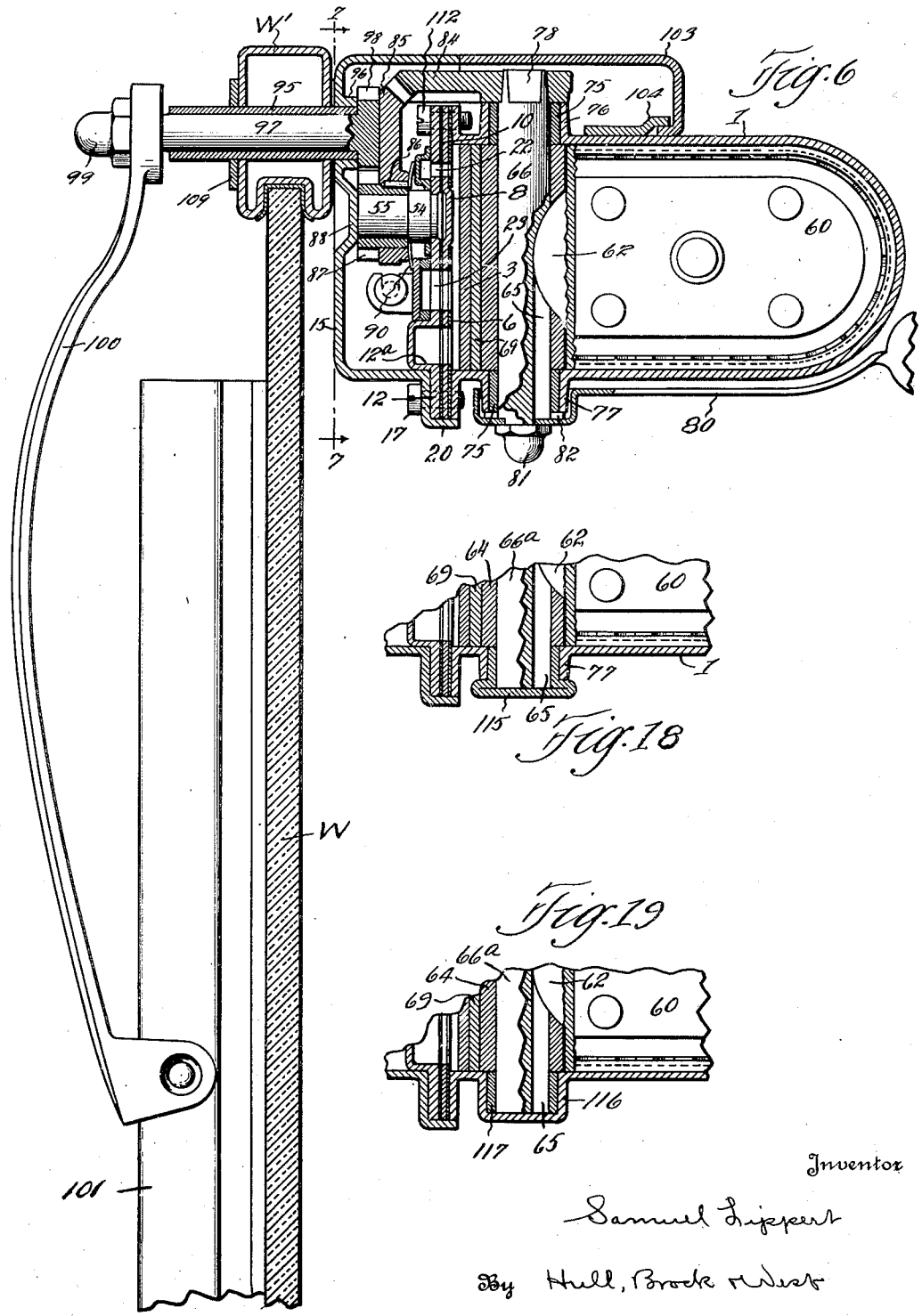

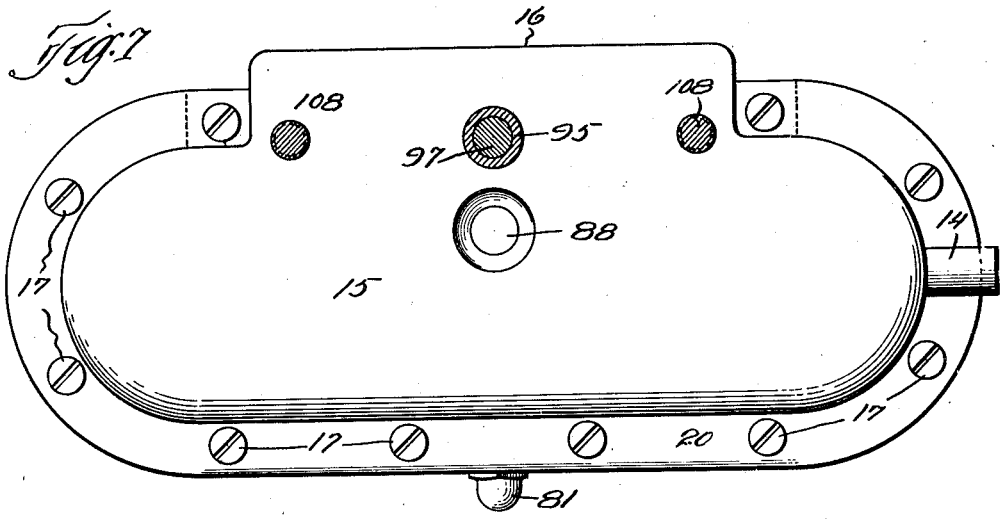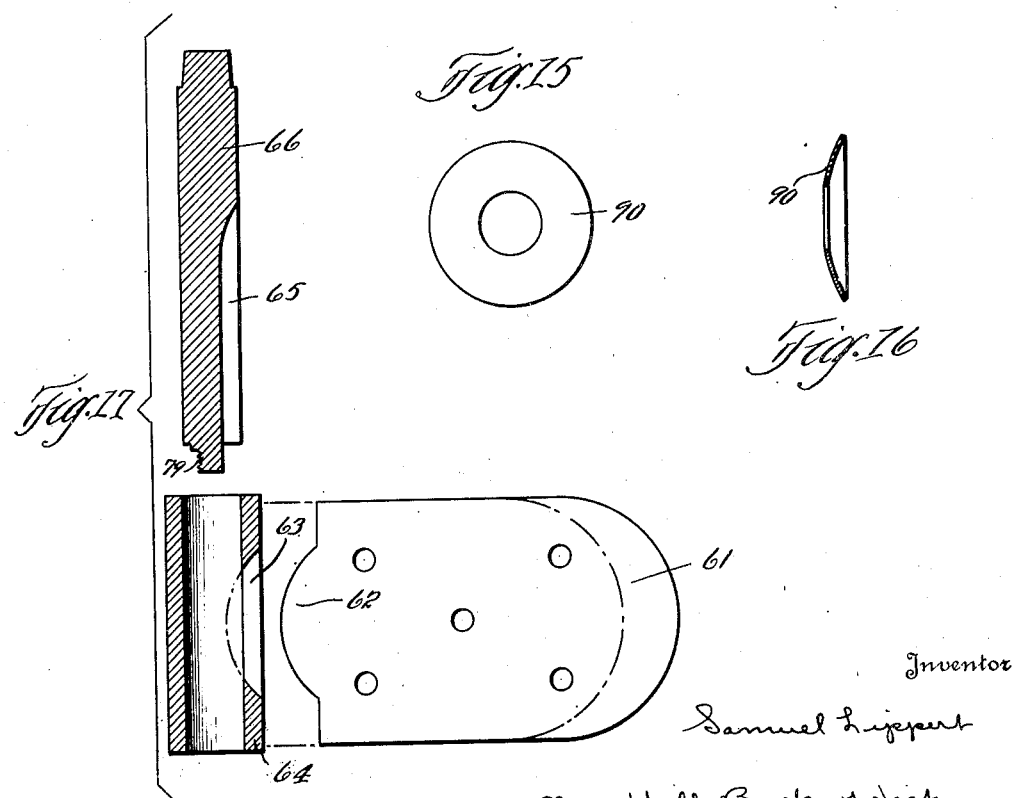

June 18, 1929.  S. LIPPERT  1,717,699
WINDSHIELD CLEANING APPARATUS AND MOTOR THEREFOR
Original Filed March 27, 1924  5 Sheets-Sheet 5
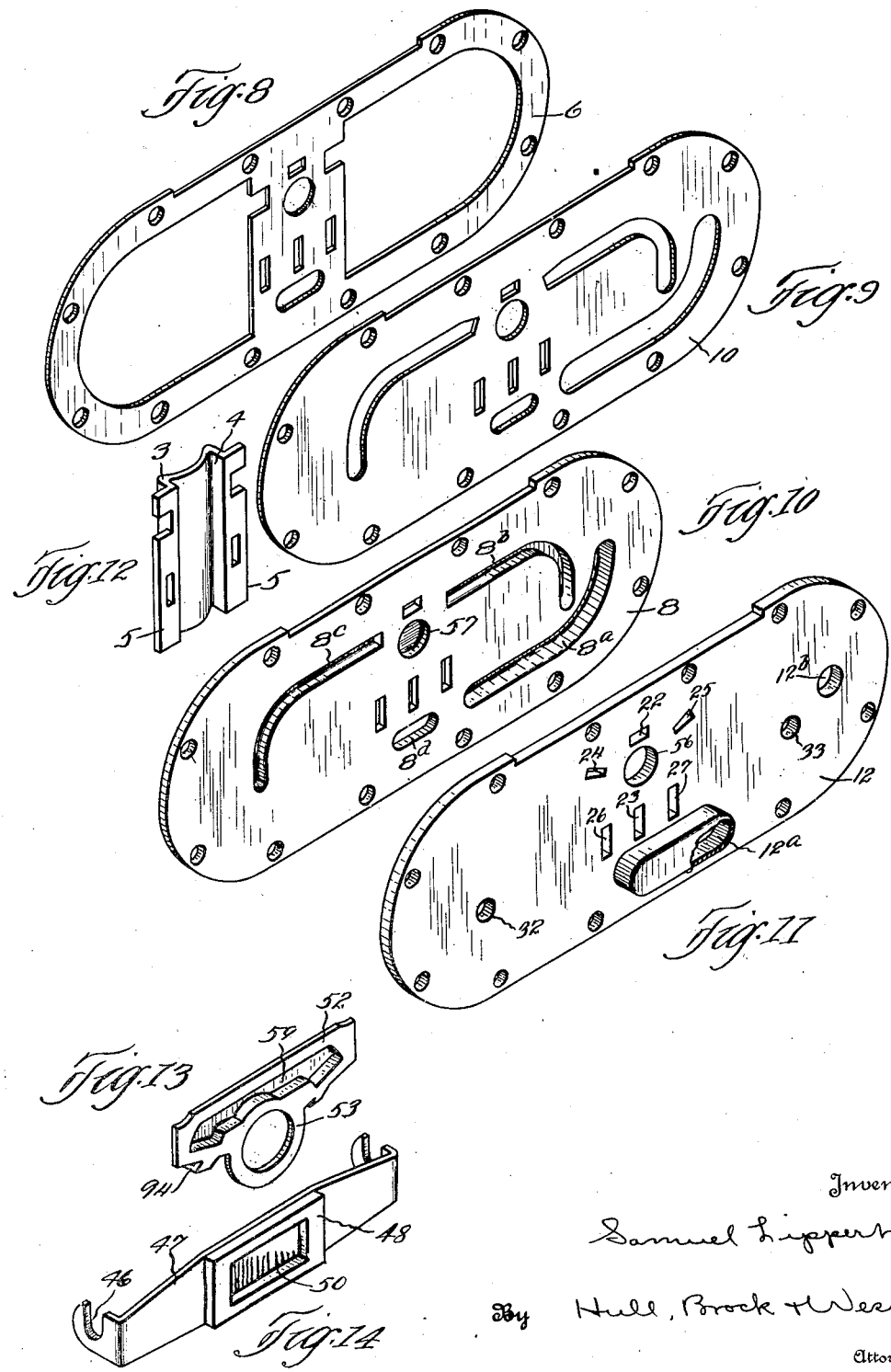
Inventor
Samuel Lippert
By Hull, Brock & West
Attorneys Patented June 18, 1929.

1,717,699

UNITED STATES PATENT OFFICE.

SAMUEL LIPPERT, OF GARFIELD HEIGHTS, OHIO.

WINDSHIELD-CLEANING APPARATUS AND MOTOR THEREFOR.

Application filed March 27, 1924, Serial No. 702,202. Renewed November 5, 1928.

This invention relates generally to windshield cleaning apparatus and more particularly to motors for operating the same, and the purpose of my present invention is to so improve and refine the construction of the motor disclosed and claimed in my copending application Serial No. 676,971, filed November 26, 1923, that the same is more economical of manufacture, is more convenient of assembly, and in every respect is of a more attractive and desirable commercial form.

Aside from this, the objects in view are substantially the same as those recited in said application, the advantages accruing from the structural refinements and improvements constituting my present invention being apparent from the following detailed description, reference being had to the accompanying drawings wherein Fig. 1 is a fragmentary rear elevation, Fig. 2 a fragmentary plan view, and Fig. 3 a similar front elevation of the windshield of a motor vehicle equipped with cleaning apparatus embodying my invention; Fig. 4 is a horizontal section through the motor on a scale somewhat enlarged over actual size; Fig. 5 is a vertical section through the valve space or compartment of the motor, the plane of section being indicated by the line 5—5 of Fig. 4; Fig. 6 is a central vertical section through the windshield cleaning apparatus and motor and through the adjacent portion of the windshield; Fig. 7 shows the motor in front elevation with the wiper shaft and its bearing and the attaching screws in section, the plane of section being indicated by the line 7—7 of Fig. 6; Figs. 8 and 9 are perspective views of gaskets employed in the construction; Figs. 10 and 11 are similar views of the passage plate and port plate respectively; Fig. 12 is a perspective view of the vane saddle; Figs. 13 and 14 show, respectively, the control valve and the main valve in perspective; Figs. 15 and 16 (Sheet 4) are a face view and a sectional view, respectively, of the valve drag member; Fig. 17 shows the main drive shaft, vane sleeve and vane plate arranged for assembly in a manner hereinafter to be described; and Figs. 18 and 19 (Sheet 3) are sectional details showing modifications of the lower bearing of the main drive shaft.

The pane and the frame of the windshield are designated W and W', respectively.

The vane chamber of the motor is enclosed by a segmental casing 1 that is open at the front where it is surrounded by a peripheral flange 2. Secured in a vertical position across the open front of the casing 1 is what I shall term the vane saddle 3 that is of channel formation and encloses a compartment 4. Flanges 5 extend from each side of the saddle 3 and their outer surfaces are in the plane of the corresponding surface of the flange 2. Applied to the open front of the casing is a gasket 6, shown in perspective in Fig. 8, and the same is coextensive with the flange 2 and saddle 3. Engaged against the gasket 6 is a passage plate 8, shown in perspective in Fig. 10. A second gasket, designated 10, and shown in perspective in Fig. 9, is placed over the front of the passage plate 8, and engaged thereagainst is a port plate 12, shown in perspective in Fig. 11.

Portions of the passage plate 8 are displaced rearwardly to provide in its front face grooves or passages $8^a$, $8^b$, and $8^c$; and a portion of the port plate 12 is displaced forwardly to provide in its rear face a passage $12^a$. Attached to the right hand end of the port plate 12 (as the same is viewed from the front) in register with an opening $12^b$ thereof, is a tubular connection 14 (see Figs. 4 and 5).

When the plates and gaskets are arranged as above described against the open front of the casing 1, communication is established between the connection 14 and the compartment 4 through the passages $8^a$ and $12^a$ and through an opening $8^d$.

A front cover 15, having a dome portion 16, is fitted against the open front of the casing, and screws 17, which pass freely through holes in the peripheral flange 18 of the cover and through corresponding holes in the plates 8 and 12 and gaskets 6 and 10, are threaded into the flange 2 of the casing. A lip 20 surrounds the flange 18 and encloses the edges of the plates, gaskets and flange 2.

The port plate 12 has central ports 22 and 23. With the former port are associated laterally spaced ports 24 and 25, and with the latter are associated laterally spaced ports 26 and 27. The central ports 22 and 23 open, through registering openings in the passage plate 8 and gaskets 6 and 10, into the motive fluid chamber 4, while the ports 26 and 27 open, through registering openings in said plate 8 and the gaskets and in the flanges 5 of the saddle 3, into the vane chamber enclosed by casing 1.

The gasket 10 has slots which register with the passages 8ᵃ, 8ᵇ and 8ᶜ of the plate 8, and the gasket 6 and the flanges 5 of the saddle 3 are cut away to accommodate the inner ends of the displaced portions of the plate 8 which enclose the passages 8ᵇ and 8ᶜ.

Pressed metal cups 30 and 31 (Figs. 4 and 5) are brazed or otherwise secured to the port plate 12, and said cups have holes which register with openings 32 and 33 in the plate 12 that lead into the outer ends of the respective passages 8ᶜ and 8ᵇ of the plate 8. The opposite ends of said passages register with the respective ports 24 and 25.

A piston operates within each of the cups 30 and 31, the one occupying the former cup being designated 35 in Figs. 4 and 5. Each piston is composed of a sheet metal body formed to properly fit within the cup and at its inner end is reduced in size for the accommodation of a dished packing element 36 of leather or the like which has its peripheral portion pressed against the wall of a cup by the edge portion of a spring pressure plate 37 that is confined between the element 36 and the inner end of the piston. A plate 38 is disposed on the opposite side of the packing element 36 and said plates and the element are clamped between the end of the piston body and a socket member 39 by the reduced end 40 of a piston pin 42 which is riveted within the socket member 39. The socket member contains a plug 43 of leather or the like which engages the end wall of the cup to limit the inward movement of the piston. The outer end of each of the piston pins 42 is circumferentially grooved to produce a neck 45 which is engaged within a notch 46 in the adjacent laterally turned end portion of a plate 47 which has applied to its rear face a rectangular frame 48, the plate and frame constituting what I shall term the main valve, designated generally by the reference numeral 50, and shown in perspective in Fig. 14. As the main valve is thus connected to the opposed motive fluid actuators, constituted of the cups 30 and 31 with their respective pistons, it is held against the plate 12, as clearly shown in Fig. 4, and rides upon the offset portion of the plate which contains the passage 12ᵃ.

A control valve 52, preferably formed from sheet metal, and shown in perspective in Fig. 13, has a hub portion 53 that is journaled upon an enlarged portion 54 of a stud 55 that is reduced at its inner end for engagement through a hole 56 in the plate 12 and beyond which the stud is riveted for the purpose of securing it to said plate. The plate 8 is shown as depressed at 57 to accommodate the stud, and the gaskets 6 and 10 are cut away in the same region. The control valve, thus supported upon the stud 55, bears against the plate 12, and a recess 59 of the valve is in constant communication with the port 22 and is adapted to be thrown into communication with first one and then the other of the ports 24 and 25, in a manner hereinafter to be described.

A vane 60 divides the chamber enclosed by the casing 1 into compartments A and B. The vane is composed of a vane plate 61 which has a profile corresponding substantially to the vertical cross-sectional shape of the casing 1 and at its inner end has a key extension 62 which is adapted to be projected through a milled slot 63 in the side of a sleeve 64 for engagement within a key-way 65 of the main drive shaft 66 that is adapted to be extended through said sleeve. The vane plate, sleeve and shaft are shown in detail in Fig. 17. With the key extension 62 of the vane plate 61 engaged within the slot 63 of the sleeve 64 and with the adjacent end of said plate bearing firmly against the sleeve, a packing element 68 of leather or other suitable material has its central portion 69 wrapped about the sleeve 64 while its end portions are extended along opposite sides of the vane plate 61. Spring metal pressure plates, having outward flaring serrated edge portions, are next applied to the outer sides of the packing element and said plates are backed up by plates 70. These various parts are then bound together by rivets 71. One of such rivets also secures in place socket members 73 which contain bumpers 74 of leather or the like that are adapted to contact with plate 8 thereby to provide positive stops for the vane 60 as it swings to and fro within the casing.

In assembling the motor the piston 60, fabricated as above described, is set in through the open front of the casing with the portion 69 of the packing element 68 engaged with the inner curved wall of the saddle 3 and with the sleeve 64 in axial alignment with the bearings 75 in the top and bottom walls of the casing, said bearings being constituted of bushings that occupy bosses 76 and 77 that are pressed from the respective top and bottom walls. The main drive shaft 66 is then inserted downwardly through the top bearing 75 with its key-way 65 in a position to receive the key extension 62 of the vane plate 61. When the downward movement of the shaft 66 is arrested by the engagement of the end of its key-way with the key extension 62, only a squared portion 78 of said shaft protrudes above the top bearing 75, while its reduced threaded lower end 79 extends below the lower bearing. As shown in Fig. 6, a pressed metal handle 80 is applied to the lower end of the shaft, and to prevent the handle from turning with respect to the shaft the reduced end of the shaft is preferably made flat on one side and the hole in the handle is made of a corresponding shape. A nut 81 is then applied to the threaded end of the shaft to secure the handle in place. To prevent possible leakage of oil about the lower end of the shaft, a packing washer 82 is compressed between the hub of the handle and the adjacent bearing.

A bevel gear segment 84 is applied to the squared end 78 of the shaft 66 and the same meshes with a similar gear segment 85 that is secured against turning, by means of a dowel pin or key 86, to the hub portion of a spur pinion 87 that is rotatably mounted upon the outer end of the stud 55 and is held against outward movement thereon by a flat inset portion 88 of the front cover 15. A drag member 90, in the nature of a dished washer that is formed of resilient metal, and which is shown in detail in Figs. 15 and 16, is confined between the hub portion of the segment 85 and the valves 50 and 52. Through the pressure of this member upon the valves sufficient friction is created between them and the plate 12 to prevent accidental displacement of the valves. A pin 92 is carried by the segment 85 for cooperation with lugs 93 and 94 that extend forwardly from the control valve 52.

A sleeve 95 has its inner end fitted within an inwardly projecting boss 96 of the front cover 15 and said sleeve constitutes a journal for a wiper shaft 97 which carries and preferably has formed integral with it, at its inner end, a pinion 98 that meshes with the previously mentioned pinion 87. To the outer end of the shaft 97 is suitably secured, as by a nut 99, a wiper carrying arm 100 to the free end of which there is connected a wiper 101 that engages the pane W of the windshield.

A top cover or housing 103 encloses the upper end of the shaft 66 and the rear portion of the segment 84 and the same is flanged inwardly at its lower edge for engagement beneath a keeper 104 that is secured to the top wall of the casing 1. The top cover is designed to match with the dome portion 16 of the front cover 15, and, as shown in Fig. 2, it is secured in place by screws 105 which extend through the flanges of the front cover and of the casing 1 and the parts engaged therebetween, and at their inner ends are threaded within lugs 106 of said top cover 103.

The sleeve 95 is engaged through an opening in the windshield frame W' and the motor is secured to said frame by screws 108 that are passed through holes in the frame and are threaded at their inner ends into the front cover 15. A plate 109 is preferably applied to the front side of the frame W' so that regardless of the contour of the frame, the heads of the screws 108 will have a flat surface upon which to bear. The plate 109 having holes for the accommodation of the screws and the sleeve 95, serves as a templet for use in locating the holes to be drilled in the windshield frame.

As in the case of the motor disclosed in my application hereinbefore referred to, my present motor is suction operated—that is, it operates by reason of its having connection with a source of suction, as the intake manifold of the internal combustion engine which propels the vehicle whereon the windshield to be cleaned is mounted.

A suitable conduit 110 is attached to the connection 14 and leads to the intake manifold of the engine (not shown). As in the earlier case, the conduit may contain a valve, preferably situated on the instrument board of the vehicle, by means of which the flow of fluid through the conduit may be controlled.

With the engine running and the passage between the intake manifold thereof and the connection 14 open, the chamber 4 is exhausted. With the parts in the position illustrated in Figs. 4 and 5, communication is established between the chamber 4 and the compartment A of the vane chamber which results in said compartment being exhausted of air through the port 26, the main valve 50 and the port 23, while air is being admitted to the compartment B through the port 27. As a consequence of this, the vane 60 moves to the left. The gear segment 84, moving in unison with the vane because of its connection therewith through the shaft 66, rotates the segment 85 and advances the pin 92, which is carried thereby, in the direction indicated by the arrow in Fig. 5. The pin 92 strikes the lug 94 and shifts the control valve 52 to the position opposite that in which said valve is shown in Fig. 5. The valve is stopped in its extreme positions by contact with screws 112 which serve to connect the upper edges of the plates 8 and 12 and the gaskets 6 and 10 to the flange 2 of the casing 1. As soon as the control valve is shifted to the position described communication is established between the chamber 4 and the cup 31 through the port 22, the recess 59 of the control valve, the port 25, and passage 8$^b$, while the cup 30 is thrown open to the atmosphere through the passage 8$^c$ and port 24. This results in suction being created within the cup 31 and a drawing in of the piston contained therein. This action shifts the main valve 50 to its extreme position opposite that illustrated in Figs. 4 and 5 whereupon compartment B is exhausted through its being thrown in communication with the chamber 4 through port 23, the recess of the main valve and port 27, compartment A now receiving atmospheric air through the port 26. This will cause the vane 60 to swing in a direction opposite to that above described and a consequential reversal of the other parts so that the control valve is moved to its former position. It will be seen, therefore, that as long as suction prevails within the chamber 4, the motor will continue to operate. As the segment 85 oscillates, its motion is transmitted through the pinions 87 and 98, the shaft 97 and the arm 100 to the wiper 101 thereby to move said wiper to and fro across the pane W of the windshield. When the power is cut off or is unavailable, as when the engine is not running, the wiper may be actuated manually by means of the handle 80.

From the detailed description of the motor it will be seen that practically all of the parts are constructed of sheet metal and are of such shape that they may be readily produced by means of stamping and forming dies, the casing 1 being drawn by such method from a single piece of sheet metal, while the bosses 76 and 77 are pressed outwardly from the respective top and bottom walls thereof. The gear segments 84 and 85 are blanked and swaged from plate of suitable thickness, while the pinion 87, and the shaft 97 with its integral pinion 98, may be produced in blank on screw machines and completed by die stamping the pinion teeth.

In cases where manual means for operating the wiper is not required, the handle 80 may be omitted and a shaft 66ª, shown in Figs. 18 and 19 may be substituted for the former shaft 66. The shaft 66ª is cut straight at its lower end and, as illustrated in Fig. 18, sets within a thimble 115 that is pressed within the boss 77 of the bottom wall of casing 1. The present construction leaves it optional as to whether the motor is equipped with manual actuating means or not. Where, in the manufacture of the motor, it is decided to omit the handle, the construction illustrated in Fig. 19 may be substituted for the forms above described and instead of forming a boss in the lower wall of the casing said wall may be depressed to form a socket 116 within which a bushing 117 is inserted to provide a suitable bearing for the lower end of the shaft 66ª.

Having thus described my invention, what I claim is:—

1. In a motor of the character described, the combination of an open front casing having bearings in its opposed side walls, a shaft journaled in said bearing, a vane secured to the shaft and dividing the interior of the casing into two compartments, a partition extending across the front of the casing and containing ports and passages through which motive fluid may be conducted to said compartments, a valve slidably engaging the front surface of the partition and cooperating with certain of the ports for controlling the passage of motive fluid to the compartments, a stud supported at right angles to the partition, a driven member journaled upon said stud, a drag member sustained by the stud and confined between said driven member and the valve, and a driving member secured to one end of the aforesaid shaft and cooperating with said driven member, the driving connections thus effected between the shaft and the driven member including means through which the valve is actuated.

2. In a motor of the character described, the combination of an open front casing having bearings in its opposed side walls, a shaft journaled in said bearing, a vane secured to the shaft and dividing the interior of the casing into two compartments, a partition extending across the front of the casing and containing ports and passages through which motive fluid may be conducted to said comparements, a valve slidably engaging the front of the partition and cooperating with certain of the ports for controlling the passage of motive fluid to the compartments, a stud supported at right angles to the partition, a driven member journaled upon said stud, a drag member sustained by the stud and confined between said driven member and the valve, a driving member secured to one end of the aforesaid shaft and cooperating with said driven member, the driving connections thus effected between the shaft and the driven member including means through which the valve is actuated, a recessed cover applied to the front of the casing and having a dome portion extending over the driving and driven members, and a housing applied to the side of the casing and cooperating with said dome portion to conceal the driving member.

3. In a motor of the character described, the combination of an open front casing having bearings in its opposed side walls, a shaft journaled in said bearing, a vane secured to the shaft and dividing the interior of the casing into two compartments, a partition extending across the front of the casing and containing ports and passages through which motive fluid may be conducted to said compartments, a valve slidably engaging the front surface of the partition and cooperating with certain of the ports for controlling the passage of motive fluid to the compartments, a stud supported at right angles to the partition, a driven member journaled upon said stud, a drag member sustained by the stud and confined between said driven member and the valve, a driving member secured to one end of the aforesaid shaft and cooperating with said driven member, the driving connections thus effected between the shaft and the driven member including means through which the valve is actuated, a recessed cover applied to the front of the casing and having a dome portion extending over the driving and driven members, a housing applied to the side of the casing and cooperating with said dome portion to conceal the driving member, a bearing supported by the cover, a shaft journaled within said bearing and having a pinion fixed to its inner end, a pinion fixed to the driven member and cooperating with the former pinion, an arm secured to the outer end of the shaft, and a wiper carried by the arm.

4. In a motor of the character described, the combination of an open front casing having bearings in its opposed side walls, a shaft journaled in said bearing, a vane secured to the shaft and dividing the interior of the casing into two compartments, a wall extending across the open side of the casing, said wall containing ports and passages through which motive fluid may be delivered to said compartments, valve mechanism for controlling the flow of motive fluid through said ports and passages to effect deliverance of said fluid to first one and then the other of the compartments, driving connections between one end of the aforesaid shaft and said valve mechanism, and a handle having a recessed hub secured to the opposite end of the shaft and enclosing the adjacent bearing and extending alongside of the casing in close proximity thereto.

5. In a motor of the character described, the combination of a casing enclosing a vane chamber, a shaft supported by and between the opposed side walls of the casing, a vane secured to the shaft and dividing the casing into two compartments, one of the walls of the casing containing ports and passage through which motive fluid may be conducted to said compartments, certain of the ports in said wall being arranged in transverse alignment, the wall having a shoulder extending alongside said ports, cups arranged in opposed relation to each other on opposite sides of said ports, pistons operating within said cups, pins secured to the pistons and having necks adjacent their outer ends, a valve slidably engaged against the side wall for controlling the passage of motive fluid through said ports, the valve having lateral extensions terminating in hook-portions that are arranged to be engaged with the necks of the aforesaid pins, the pins serving, when the valve is so connected thereto, to maintain the valve against the wall and shoulder, certain of the passages of said wall communicating with said cups, a control valve for effecting deliverance of motive fluid to first one and then the other of said cups thereby to actuate the pistons and slide the before mentioned valve, and driving connections between the shaft and the control valve.

6. In a motor of the character described, the combination of a casing having bearings in its opposed side walls, a sleeve arranged transversely of the casing in axial alignment with said bearings, said sleeve having a slot in one side, a vane plate having a key extension projecting through the slot in the sleeve, a shaft adapted to be inserted through one of the bearings and into the sleeve and having a key-way for the reception of the key extension, a packing element having its central portion wrapped about the sleeve and its end portions disposed on opposite sides of the vane, means for maintaining the edges of the end portions of said packing elements in contact with the casing wall, the casing containing ports and passages through which motive fluid may be delivered to the interior of the casing on opposite sides of the vane plate, valve mechanism for controlling the flow of motive fluid through said ports and passages, and driving connections between the shaft and valve mechanism.

7. In a motor of the character described, the combination of an open front casing having bearings in its opposed side walls, a shaft journaled in said bearings, a vane secured to the shaft and dividing the interior of the casing into two compartments, a partition extending across the front of the casing and containing ports and passages through which motive fluid may be conducted to said compartments, a valve slidably engaging the front surface of the partition and cooperating with certain of the ports for controlling the passage of motive fluid to the compartments, a stud supported at right angles to the partition, a driven member journaled upon said stud, and a driving member secured to one end of the aforesaid shaft and cooperating with said driven member, the driven member and the valve having, one a thrust element, and the other abutments for engagement by said element, whereby the valve is shifted through the instrumentality of said driven member.

In testimony whereof, I hereunto affix my signature.

SAMUEL LIPPERT.